United States Patent
Qian et al.

(10) Patent No.: US 11,980,833 B2
(45) Date of Patent: May 14, 2024

(54) EFFICIENT SIMULATED MOVING BED DEVICE AND EFFICIENT SIMULATED MOVING BED PROCESS

(71) Applicant: Inner Mongolia Yitai Coal-based New Materials Research Institute Co., Ltd., Erdos (CN)

(72) Inventors: Zhen Qian, Erdos (CN); Jingwei Wu, Erdos (CN); Juncheng Li, Erdos (CN); Jingquan Zhang, Inner Mongolia (CN); Qinge Jian, Inner Mongolia (CN); Xiaolong Zhang, Erdos (CN); Yuan Gao, Erdos (CN); Xueting Wu, Erdos (CN); Haoting Chen, Erdos (CN)

(73) Assignee: Inner Mongolia Yitai Coal-based New Materials Research Institute Co., Ltd., Erdos (CN)

( * ) Notice: Subject to any disclaimer, the term of this patent is extended or adjusted under 35 U.S.C. 154(b) by 249 days.

(21) Appl. No.: 17/293,862

(22) PCT Filed: Jul. 5, 2019

(86) PCT No.: PCT/CN2019/094854
§ 371 (c)(1),
(2) Date: May 13, 2021

(87) PCT Pub. No.: WO2020/098295
PCT Pub. Date: May 22, 2020

(65) Prior Publication Data
US 2022/0008840 A1 Jan. 13, 2022

(30) Foreign Application Priority Data
Nov. 14, 2018 (CN) .......................... 201811362623.8

(51) Int. Cl.
*B01D 15/18* (2006.01)

(52) U.S. Cl.
CPC ..... *B01D 15/1842* (2013.01); *B01D 15/1828* (2013.01); *B01D 2215/023* (2013.01)

(58) Field of Classification Search
CPC ............ B01D 15/1842; B01D 15/1828; B01D 2215/023
See application file for complete search history.

(56) References Cited

U.S. PATENT DOCUMENTS 3,706,812 A   12/1972   Derosset et al.
4,797,233 A * 1/1989   Zinnen .................... C07C 67/56
                                                      554/193

(Continued)

FOREIGN PATENT DOCUMENTS

CN        1127670 A     7/1996
CN      201618442 U    11/2010
(Continued)

OTHER PUBLICATIONS

Machine translation of JP 2018/004567.*
(Continued)

*Primary Examiner* — Benjamin L Lebron
(74) *Attorney, Agent, or Firm* — Osha Bergman Watanabe & Burton LLP

(57) ABSTRACT

An efficient simulated moving bed device and an efficient simulated moving bed process are provided. The efficient simulated moving bed device comprises an adsorption bed, a raw material feeding system, a desorbent feeding system, a circulating system, an extract system, a raffinate system, a program-controlled valve group, and an automatic control system.

15 Claims, 2 Drawing Sheets

(56) References Cited

U.S. PATENT DOCUMENTS

| | | | |
|---|---|---|---|
| 5,705,061 A | 1/1998 | Moran | |
| 6,004,518 A | 12/1999 | Green | |
| 6,325,940 B1 | 12/2001 | Ikeda | |
| 2016/0090346 A1* | 3/2016 | Diamond | C07C 51/47 562/580 |
| 2017/0348613 A1* | 12/2017 | Airaksinen | B01D 15/1828 |
| 2018/0002253 A1* | 1/2018 | Dorsi | C07C 7/12 |
| 2018/0296941 A1 | 10/2018 | Augier et al. | |
| 2020/0385415 A1* | 12/2020 | Park | B01D 15/361 |

FOREIGN PATENT DOCUMENTS

| | | | |
|---|---|---|---|
| CN | 101940850 A | 1/2011 | |
| CN | 202315413 U | 7/2012 | |
| CN | 203220780 U | 10/2013 | |
| CN | 105521622 A | 4/2016 | |
| CN | 107879900 A | 4/2018 | |
| CN | 109432822 A | 3/2019 | |
| CN | 209575841 U | 11/2019 | |
| EP | 2108423 A1 | 10/2009 | |
| FR | 2978358 A1 | 2/2013 | |
| JP | H04131761 A | 5/1992 | |
| JP | H04334504 A | 11/1992 | |
| JP | 2018004567 A * | 1/2018 | |
| WO | 2013055932 A1 | 4/2013 | |
| WO | WO-2018105931 A1 * | 6/2018 | B01D 15/185 |

OTHER PUBLICATIONS

Extended European Search Report issued in corresponding EP Application No. 19883376.6 dated Jul. 8, 2022 (9 bages).

Office Action issued in corresponding JP Application No. 2012-515458 with English translation dated May 10, 2022 (12 pages).

International Search Report issued in International Application No. PCT/CN2019/094854 with English translation dated Sep. 24, 2019 (7 pages).

Written Opinion issued in International Application No. PCT/CN2019/094854 dated Sep. 24, 2019 (5 pages).

Office Action issued in Chinese Application No. 201811362623.8 dated Apr. 10, 2023 (9 pages).

* cited by examiner

EFFICIENT SIMULATED MOVING BED DEVICE AND EFFICIENT SIMULATED MOVING BED PROCESS

CROSS-REFERENCE TO RELATED APPLICATIONS

The present disclosure is a Section 371 National Stage Application of International Application No. PCT/CN2019/094854, filed on Jul. 5, 2019, entitled "HIGH-PERFORMANCE SIMULATED MOVING BED DEVICE AND HIGH-PERFORMANCE SIMULATED MOVING BED TECHNIQUE", and the PCT Application claims priority to Chinese Patent Application No. 201811362623.8, filed on Nov. 14, 2018, the disclosure of which is incorporated herein by reference in their entirety.

TECHNICAL FIELD

The present disclosure relates to a field of simulated moving bed separation technology, and in particular to an efficient simulated moving bed device and an efficient simulated moving bed process.

BACKGROUND

Simulated moving bed is a separation device that performs separations by using an adsorption principle. As a main representative of continuous chromatography, simulated moving bed technology has high production efficiency, low consumption of organic solvents and large mass transfer driving force, and is convenient for automatic continuous production. It is widely used in petrochemical, food industry and pharmaceutical fields. The simulated moving bed technology is a complex industrial process as well as a non-linear, non-equilibrium, non-ideal, multi-degree-of-freedom periodic process with a plurality of influencing factors.

In the simulated moving bed, a fixed adsorption bed is divided into a plurality of sections filled with adsorbents, and liquid may not directly circulate between the sections. Each section is provided with inlet and outlet pipes, which are controlled by a multi-channel rotary valve. Generally, in a simulated moving bed with 8 adsorption columns, 20 of 24 inlets and outlets only serve as inter-section connections, and the other 4 inlets and outlets are used for entering or exiting of four strands of materials. Positions of the material inlets and outlets at a certain moment divide the entire adsorption bed into four zones. Each zone has a different length, and each section has a different interphase mass transfer.

By using the multi-channel rotary valve, the simulated moving bed enables the four material inlets and outlets to move upward at a speed synchronized with a change of a solid phase concentration. In this way, a closed loop is formed. An overall result of the closed loop is substantially the same as an effect produced by keeping the positions of the inlets and outlets in place while moving the solid adsorbent from top to bottom in the adsorber, so as to achieve a separation effect. A core device of this process is the multi-channel rotary valve. With a rotation of the multi-channel rotary valve, a periodic switching of the process is realized, thereby achieving a purpose of separating products.

In the related art, CN100453867C discloses a 36-way rotary valve used for a simulated moving bed of an efficient liquid chromatography. The 36-way rotary valve is connected to a stepping motor provided with a synchronous pulley through a belt. The 36-way rotary valve mainly includes a stator and a cover mounted on the stator. A transmission shaft is provided between the stator and the cover. The transmission shaft has one end inserted into a center hole of the stator and another end that passes through the cover and that is installed with a further synchronous pulley. A sealing ring is installed and fixed evenly on a periphery of the stator and the cover. A rotor, a driving disc, a disc spring, an adjusting pad and a thrust bearing are further provided in sequence from bottom to top between the stator and the cover. The 36-way rotary valve has a compact structure and a small dead volume, which greatly reduces a failure rate of the simulated moving bed device. However, the 36-way rotary valve has a high cost and is inconvenient for disassembly and maintenance. When replacing the adsorbent, the entire simulated moving bed device needs to be shut down, which reduces a long-term operation capability of the device.

The use of a program-controlled valve in the simulated moving bed is already an existing technology. The Axens Eluxyl simulated moving bed process and the Sorpx simulated moving bed process are also controlled by n*24 program-controlled valve groups. However, due to different volumes of pipelines of the program-controlled valve groups connected to the adsorption columns as well as a periodic change of a relative position of the circulating pump in an area, a flow rate of the circulating pump varies greatly with the area in which it is located, which is difficult to control and has a large pressure fluctuation.

SUMMARY

In view of the above-mentioned technical problems of the simulated moving bed in the related art, an objective of the present disclosure is to provide an efficient simulated moving bed device and an efficient simulated moving bed process. In the present disclosure, a program-controlled valve group instead of a conventional multi-channel rotary valve is used to control a periodic switching of the simulated moving bed, which reduces a device cost. The program-controlled valve group may be flexibly switched out according to maintenance requirements, thereby facilitating the device maintenance. Each adsorption column may be switched out for maintenance and switched into the system after replacing the adsorbent. In this way, the long-term operation capability of the device is greatly improved. Furthermore, in the present disclosure, each pipeline connected to the adsorption column has a same volume, and the relative position of the circulating pump in an area is constant. Therefore, the flow rate of the circulating pump is unchanged, the pressure fluctuation is small, and the control is simple.

A first aspect of the present disclosure provides an efficient simulated moving bed device, including an adsorption bed, a raw material feeding system, a desorbent feeding system, a circulating system, an extract system, a raffinate system, a program-controlled valve group, and an automatic control system; wherein the adsorption bed includes a plurality of adsorption columns divided into an adsorption zone, a purification zone and a desorption zone; each adsorption column of the plurality of adsorption columns has an upper end provided with a raw material feeding valve, a desorbent feeding valve and a circulation fluid feeding valve and a lower end provided with a raffinate discharge valve and an extract discharge valve; a check valve is provided between two adjacent adsorption columns; the raw material feeding system is connected to the raw material feeding valve of the each adsorption column; the desorbent feeding system is connected to the desorbent feeding valve of the each adsorption column; the circulating system includes a circulating pump connected to the circulation liquid feeding valve of the each adsorption column; the extract system is connected to the extract discharge valve of the each adsorption column; the raffinate system is connected to the raffinate discharge valve of the each adsorption column; all the valves form the program-controlled valve group, the program-controlled valve group is connected to the automatic control system, and the automatic control system is configured to control an opening state and a closing state of each valve in the program-controlled valve group.

For example, the adsorption bed includes 3 to 100 adsorption columns.

For example, the adsorption bed includes 8*N adsorption columns, where N is an integer greater than or equal to 1.

For example, the raw material feeding system includes a raw material pump and a raw material heater located downstream of the raw material pump, and the raw material heater includes an outlet pipeline connected to the adsorption column.

For example, the desorbent feeding system includes a desorbent pump and a desorbent heater located downstream of the desorbent pump, and the desorbent heater includes an outlet pipeline connected to the adsorption column.

For example, the extract system includes an extract pump connected to an extract pipeline of the adsorption bed.

For example, a cooler is provided on the extract pipeline.

For example, the raffinate system includes a raffinate pump or a back-pressure valve connected to a raffinate pipeline of the adsorption bed. For example, a cooler is provided on the raffinate pipeline.

For example, the circulating pump of the circulating system includes a feed port connected to the extract pipeline of the adsorption bed.

For example, a heater and/or a flow meter are/is provided downstream of the circulating pump of the circulating system.

For example, each of the valves in the program-controlled valve group is independently selected as one of a ball valve, a needle valve, a stop valve, and a butterfly valve.

For example, the valve includes a pneumatic actuator or an electric actuator.

For example, a relative position of the circulating pump in an area is constant.

For example, each connecting pipeline between the adsorption columns has a same volume.

For example, each pipeline of each adsorption column connected to the circulating pump has a same volume.

For example, the adsorption bed further includes a buffer zone. That is, the adsorption bed is divided into the adsorption zone, the purification zone, the desorption zone, and the buffer zone.

A second aspect of the present disclosure provides an efficient simulated moving bed process implemented by the efficient simulated moving bed device described above, in which valves are controlled to switch to change each feeding position and each discharging position so as to perform a simulated movement of an adsorption zone, a purification zone and a desorption zone.

For example, the valves are controlled to switch to change each feeding position and each discharging position so as to perform a simulated movement of an adsorption zone, a purification zone, a desorption zone and a buffer zone.

For example, the adsorption bed includes 8 adsorption columns. The efficient simulated moving bed process specifically includes following steps. In 0-t stage, a check valve A1 and a desorbent feeding valve A2 of an adsorption column 1, a desorbent feeding valve B2 and an extract discharge valve B6 of an adsorption column 2, a circulation fluid feeding valve C4 of an adsorption column 3, a check valve D1 of an adsorption column 4, a check valve E1 and a raw material feeding valve E3 of an adsorption column 5, a check valve F1 and a raffinate discharge valve F5 of an adsorption column 6, a check valve G1 of an adsorption column 7, and a check valve H1 of an adsorption column 8 are opened, and other valves are closed. At this time, the adsorption zone includes the adsorption column 5 and the adsorption column 6, the raw material enters the adsorption column 5 and the adsorption column 6, a target product component is absorbed, and a non-target component flows out from the outlet. The purification zone includes the adsorption column 3 and the adsorption column 4, and the circulating pump drives the circulation liquid into the adsorption column 3 and the adsorption column 4 to purify the target product component adsorbed in a previous period. The desorption zone includes the adsorption column 1 and the adsorption column 2, the desorbent pump drives the desorbent and a part of the desorbent from the buffer zone to enter the adsorption column 1 and the adsorption column 2, and the target product component purified in a previous stage is eluted and extracted from the system, thereby achieving the adsorption and separation. The buffer zone includes the adsorption column 7 and the adsorption column 8, most of the target product component in the raw material is adsorbed in the adsorption zone, and a remaining mixture containing a large amount of non-target component and a small amount of target component enters the buffer zone and waits for a next period. The valves are controlled to switch to change positions of feeding and discharging materials in t-2t, 2t-3t and 3t-4t stages, thereby realizing the simulated movement of the adsorption zone, the purification zone, the desorption zone and the buffer zone.

Compared with the related art, the present disclosure achieves beneficial effects. In view of the technical problems that the multi-channel rotary valve in the related art has a high cost and a poor long-term operation ability and is difficult in maintenance and difficult to control, the present disclosure creatively provides an efficient simulated moving bed device, in which the program-controlled valve group instead of the conventional multi-channel rotary valve is used to control the periodic switching of the simulated moving bed, thereby reducing the device cost. The program-controlled valve group may be flexibly switched out according to maintenance requirements, thereby facilitating the device maintenance. Each adsorption column may be switched out for maintenance and switched into the system after replacing the adsorbent. In this way, the long-term operation capability of the device is greatly improved. In the present disclosure, each pipeline connected to the adsorption column has a same volume, and the relative position of the circulating pump in an area is constant. Therefore, the flow rate of the circulating pump is constant, the pressure fluctuation is small, and the control is simple.

DETAILED DESCRIPTION OF EMBODIMENTS

Figure 1:
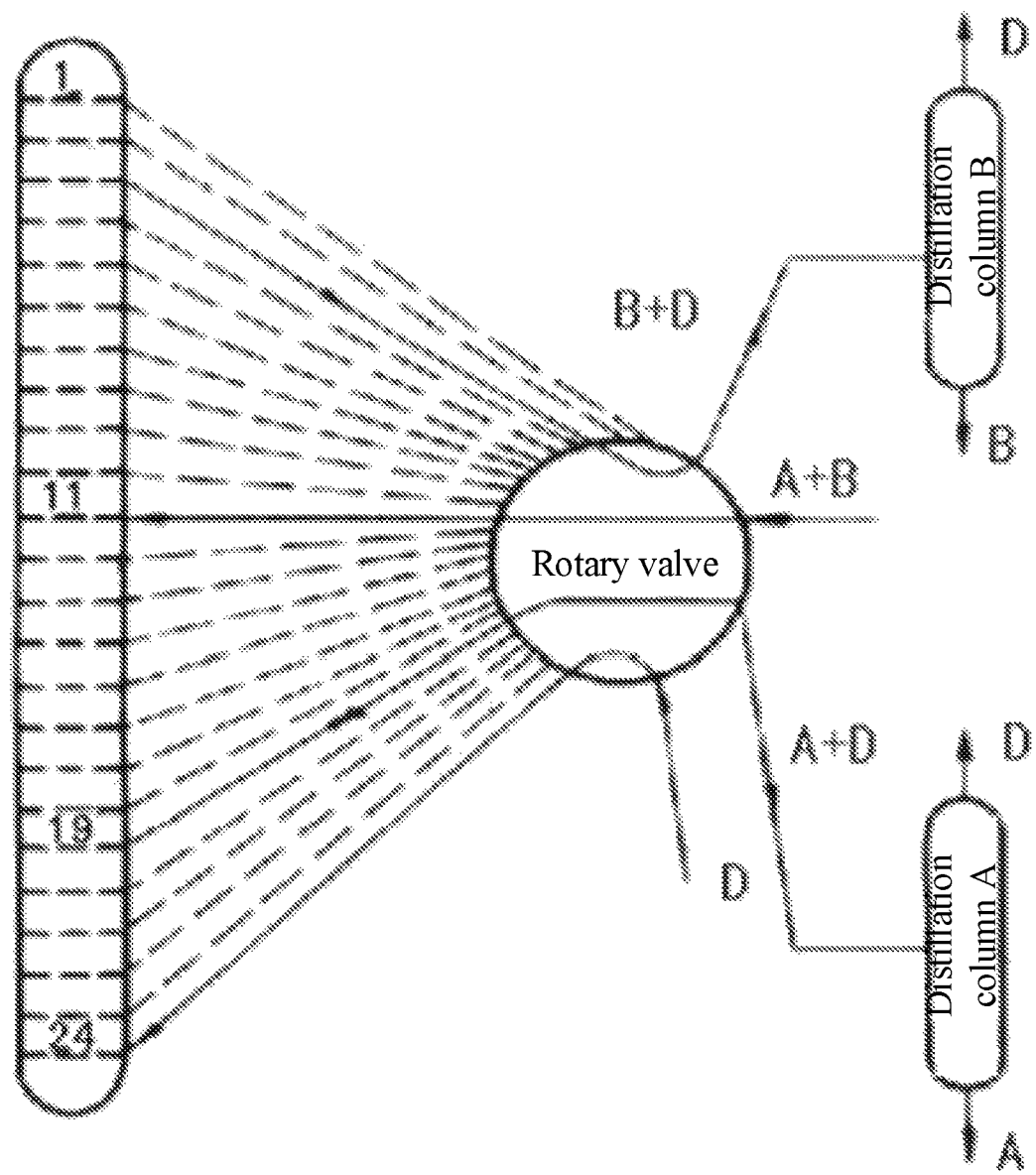
FIG. 1 shows a schematic diagram of a simulated moving bed device with a multi-channel rotary valve in the related art.

FIG. 1 shows a schematic diagram of a simulated moving bed device with a multi-channel rotary valve in the related art. In the simulated moving bed, a fixed adsorption bed is divided into a plurality of sections filled with adsorbents. With a rotation of the multi-channel rotary valve, a periodic switching of a process is realized. Positions of material inlets and outlets at a certain moment divide the entire adsorption bed into four zones. By using the multi-channel rotary valve, the simulated moving bed enables the four material inlets and outlets to move upward at a speed synchronized with a change of a solid phase concentration. In this way, a closed loop is formed. An overall result of the closed loop is substantially the same as an effect produced by keeping the positions of the inlets and outlets in place while moving the solid adsorbent from top to bottom in an adsorber, so as to achieve the separation of component A and component B. A core device of this process is the multi-channel rotary valve, so as to achieve the purpose of separating products. The simulated moving bed with the multi-channel rotary valve in the related art has technical problems such as high cost, difficult maintenance, poor long-term operation capability and difficult control, which affect the separation effect of the simulated moving bed.

In order to solve the above technical problems, the present disclosure provides a new efficient simulated moving bed device. The technical solution of the present disclosure will be described in detail below in conjunction with specific embodiments and drawings.

Figure 2:
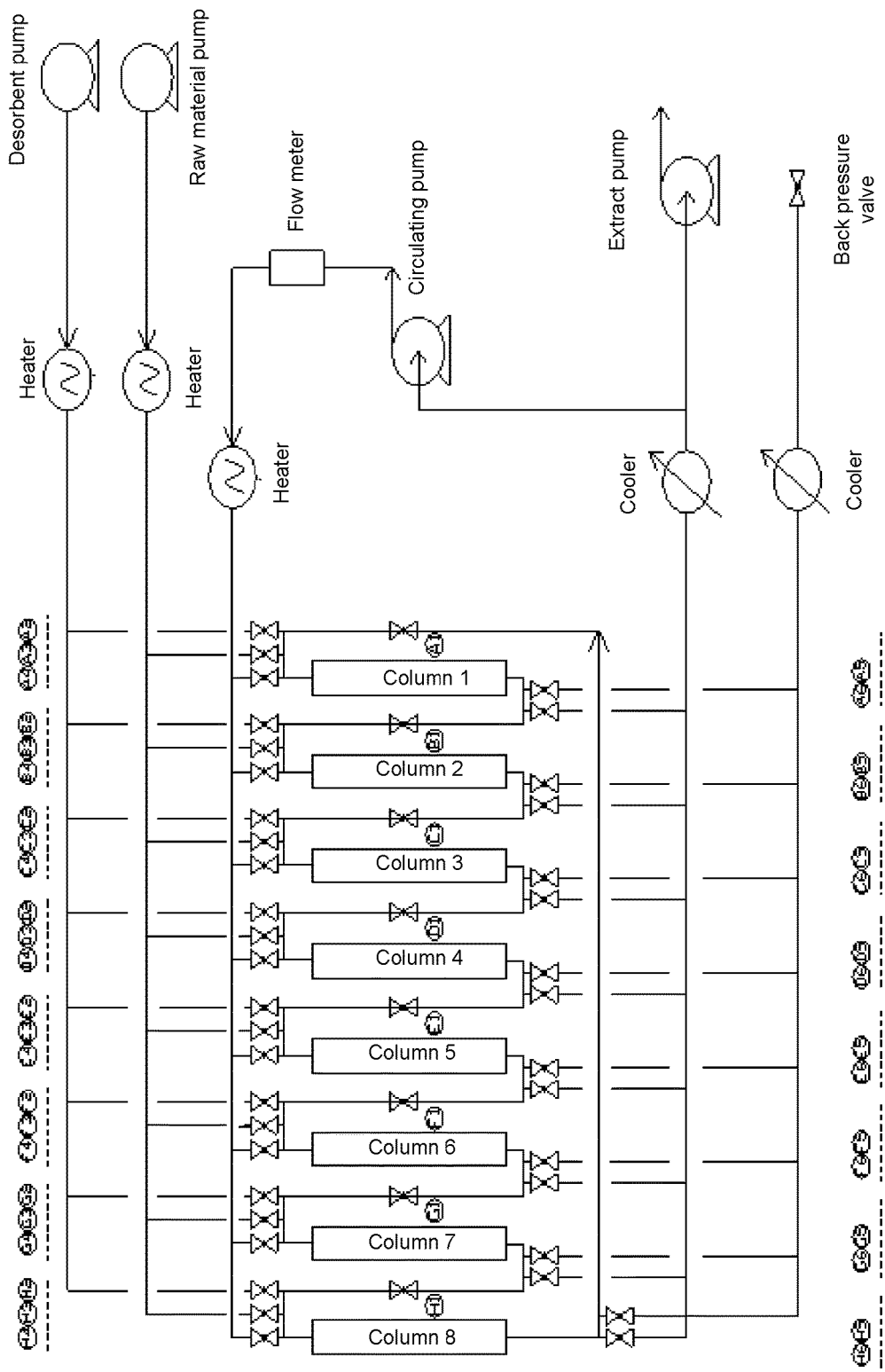
FIG. 2 shows a schematic diagram of an efficient simulated moving bed device of the present disclosure.

Referring to FIG. 2, an adsorption bed including 8 adsorption columns is illustrated by way of example.

The efficient simulated moving bed device includes an adsorption bed, a raw material feeding system, a desorbent feeding system, a circulating system, an extract system, a raffinate system, a program-controlled valve group, and an automatic control system. Adsorption columns of the adsorption bed are divided into an adsorption zone, a purification zone, a desorption zone and a buffer zone (it should be noted that the adsorption bed including the adsorption zone, the purification zone, the desorption zone and the buffer zone is used in this embodiment, but the buffer zone is not necessary for the present disclosure and is optional).

Upper ends of the adsorption columns 1 to 8 are respectively provided with raw material feeding valves A3, B3, C3, D3, E3, F3, G3, H3, desorbent feeding valves A2, B2, C2, D2, E2, F2, G2, H2, and circulation fluid feeding valves A4, B4, C4, D4, E4, F4, G4, H4. Lower ends of the adsorption columns 1 to 8 are respectively provided with raffinate discharge valves A5, B5, C5, D5, E5, F5, G5, H5, and extract discharge valves A6, B6, C6, D6, E6, F6, G6, H6. Check valves A1, B1, C1, D1, E1, F1, G1, H1 are provided between two adjacent adsorption columns. The raw material feeding system is connected to the raw material feeding valves A3, B3, C3, D3, E3, F3, G3, H3 of the adsorption columns. The desorbent feeding system is connected to the desorbent feeding valves A2, B2, C2, D2, E2, F2, G2, H2 of the adsorption columns. The circulating system includes a circulating pump, and the circulating liquid feeding system is connected to the circulation liquid feeding valves A4, B4, C4, D4, E4, F4, G4, H4 of the adsorption columns through the circulating pump. The extract system is connected to the extract discharge valves A6, B6, C6, D6, E6, F6, G6, H6 of the adsorption columns. The raffinate system is connected to the raffinate discharge valves A5, B5, C5, D5, E5, F5, G5, H5 of the adsorption columns.

In this embodiment, a relative position of the circulating pump in an area remains unchanged, and thus a flow rate of the circulating pump remains unchanged. Each of the connecting pipelines between the adsorption columns has a same volume, and each of the pipelines of the adsorption columns connected to the circulating pump has a same volume. Therefore, the flow rate of the circulating pump of this embodiment is unchanged, the pressure fluctuation is small, and the control is simple.

In this embodiment, all the valves form the program-controlled valve group, the program-controlled valve group is connected to the automatic control system, and the automatic control system may control an opening and closing states of each valve in the program-controlled valve group.

As an improvement of this embodiment, optionally, the raw material feeding system includes a raw material pump and a raw material heater located downstream of the raw material pump, and the raw material heater includes an outlet pipeline connected to the adsorption column. The raw material pump may provide a feed power to feed the raw material, and the raw material heater may heat the raw material to an appropriate temperature, so as to improve the adsorption activity. Specific pumping pressure and heating temperature are determined according to characteristics of a material separation system.

As an improvement of this embodiment, optionally, the desorbent feeding system includes a desorbent pump and a desorbent heater located downstream of the desorbent pump, and the desorbent heater includes an outlet pipeline connected to the adsorption column. The desorbent pump may provide a feed power to feed the desorbent, and the desorbent heater may heat the desorbent to an appropriate temperature, so as to improve the desorbent activity. Specific pumping pressure and heating temperature are determined according to characteristics of a material separation system.

As an improvement of this embodiment, optionally, the extract system includes an extract pump connected to an extract pipeline of the adsorption bed. The extract pump may provide an extraction power for the extract.

As an improvement of this embodiment, optionally, the raffinate system includes a raffinate pump or a back pressure valve connected to a raffinate pipeline of the adsorption bed. The raffinate pump may provide an extraction power for the raffinate.

As an improvement of this embodiment, optionally, the circulating pump of the circulating system includes a feed port connected to the extract pipeline of the adsorption bed, so as to circulate the extract.

As an improvement of this embodiment, optionally, each of the valves in the program-controlled valve group is independently selected as one of a ball valve, a needle valve, a stop valve, and a butterfly valve. That is, the 56 valves in this embodiment are independently one of a ball valve, a needle valve, a stop valve, and a butterfly valve, without interfering each other. The valve includes a pneumatic actuator or an electric actuator.

As an improvement of this embodiment, optionally, a relative position of the circulating pump in an area remains unchanged, and therefore a flow rate of the circulating pump remains unchanged. Each of the connecting pipelines between the adsorption columns has a same volume, and each of the pipelines of the adsorption columns connected to the circulating pump has a same volume. Therefore, a flow rate of the circulating pump of this embodiment is unchanged, the pressure fluctuation is small, and the control is simple.

There is provided an efficient simulated moving bed process using the efficient simulated moving bed device with 8 adsorption columns described in the above embodiment, in which valves are controlled to switch, so as to change each feeding position and each discharging position, so that a simulated movement of an adsorption zone, a purification zone, a desorption zone, and buffer zone is realized. The efficient simulated moving bed process includes the following steps.

In 0-t stage, the check valve A1 and the desorbent feeding valve A2 of the adsorption column 1, the desorbent feeding valve B2 and the extract discharge valve B6 of the adsorption column 2, the circulation fluid feeding valve C4 of the adsorption column 3, the check valve D1 of the adsorption column 4, the check valve E1 and the raw material feeding valve E3 of the adsorption column 5, the check valve F1 and the raffinate discharge valve F5 of the adsorption column 6, the check valve G1 of the adsorption column 7, and the check valve H1 of the adsorption column 8 are opened, and the other valves are closed.

At this time, the adsorption zone includes the adsorption column 5 and the adsorption column 6, the raw material enters the adsorption column 5 and the adsorption column 6, a target product component is absorbed, and a non-target component flows out from the outlet.

The purification zone includes the adsorption column 3 and the adsorption column 4, and the circulating pump drives a circulation liquid into the adsorption column 3 and the adsorption column 4 to purify the target product component adsorbed in a previous period.

The desorption zone includes the adsorption column 1 and the adsorption column 2, the desorbent pump drives a desorbent and a part of a desorbent from the buffer to enter the adsorption column 1 and the adsorption column 2, and the target product component purified in a previous period is eluted and extracted from the system, thereby achieving the adsorption and separation.

The buffer zone includes the adsorption column 7 and the adsorption column 8, most of the target product component in the raw material is adsorbed in the adsorption zone, and a remaining mixture containing a large amount of non-target component and a small amount of target component enters the buffer zone and waits for a next period.

The valves are controlled to switch to change positions of feeding and discharging materials in t-2t, 2t-3t and 3t-4t stages, thereby realizing the simulated movement of the adsorption zone, the purification zone, the desorption zone and the buffer zone.

Valve controls in 0-1t, t-2t, 2t-3t, 3t-4t stages are shown in Table 1 to Table 4.

TABLE 1

Valve control in 0-1t stage 0-t

| | | | | | | |
|---|---|---|---|---|---|---|
| Column 1 | A1 | A2 | A3 | A4 | A5 | A6 |
| State | ✓ | ✓ | x | x | x | x |
| Column 2 | B1 | B2 | B3 | B4 | B5 | B6 |
| State | x | ✓ | x | x | x | ✓ |
| Column 3 | C1 | C2 | C3 | C4 | C5 | C6 |
| State | x | x | x | ✓ | x | x |
| Column 4 | D1 | D2 | D3 | D4 | D5 | D6 |
| State | ✓ | x | x | x | x | x |
| Column 5 | E1 | E2 | E3 | E4 | E5 | E6 |
| State | ✓ | x | ✓ | x | x | x |
| Column 6 | F1 | F2 | F3 | F4 | F5 | F6 |
| State | ✓ | x | x | x | ✓ | x |
| Column 7 | G1 | G2 | G3 | G4 | G5 | G6 |
| State | ✓ | x | x | x | x | x |
| Column 8 | H1 | H2 | H3 | H4 | H5 | H6 |
| State | ✓ | x | x | x | x | x |

Valve opened ✓
Valve closed x

TABLE 2

Valve control in t-2t stage t-2t

| | | | | | | |
|---|---|---|---|---|---|---|
| Column 1 | A1 | A2 | A3 | A4 | A5 | A6 |
| State | ✓ | x | x | x | x | x |
| Column 2 | B1 | B2 | B3 | B4 | B5 | B6 |
| State | ✓ | ✓ | x | x | x | x |
| Column 3 | C1 | C2 | C3 | C4 | C5 | C6 |
| State | x | x | x | x | x | ✓ |
| Column 4 | D1 | D2 | D3 | D4 | D5 | D6 |
| State | x | x | x | ✓ | x | x |
| Column 5 | E1 | E2 | E3 | E4 | E5 | E6 |
| State | ✓ | x | x | x | x | x |
| Column 6 | F1 | F2 | F3 | F4 | F5 | F6 |
| State | ✓ | x | ✓ | x | x | x |
| Column 7 | G1 | G2 | G3 | G4 | G5 | G6 |
| State | ✓ | x | x | x | ✓ | x |
| Column 8 | H1 | H2 | H3 | H4 | H5 | H6 |
| State | ✓ | x | x | x | x | x | valve opened ✓
valve closed x

TABLE 3

Valve control in 2t-3t stage 2t-3t

| | | | | | | |
|---|---|---|---|---|---|---|
| Column 1 | A1 | A2 | A3 | A4 | A5 | A6 |
| State | ✓ | x | x | x | x | x |
| Column 2 | B1 | B2 | B3 | B4 | B5 | B6 |
| State | ✓ | x | x | x | x | x |
| Column 3 | C1 | C2 | C3 | C4 | C5 | C6 |
| State | ✓ | ✓ | x | x | x | x |
| Column 4 | D1 | D2 | D3 | D4 | D5 | D6 |
| State | ✓ | x | x | x | x | ✓ |
| Column 5 | E1 | E2 | E3 | E4 | E5 | E6 |
| State | x | x | x | ✓ | x | x |
| Column 6 | F1 | F2 | F3 | F4 | F5 | F6 |
| State | ✓ | x | x | x | x | x |
| Column 7 | G1 | G2 | G3 | G4 | G5 | G6 |
| State | ✓ | x | ✓ | x | x | x |
| Column 8 | H1 | H2 | H3 | H4 | H5 | H6 |
| State | ✓ | x | x | x | ✓ | x | valve opened ✓
valve closed x

TABLE 4

Valve control in 3t-4t stage 3t-4t

| | | | | | | |
|---|---|---|---|---|---|---|
| Column 1 | A1 | A2 | A3 | A4 | A5 | A6 |
| State | ✓ | x | x | x | ✓ | x |
| Column 2 | B1 | B2 | B3 | B4 | B5 | B6 |
| State | ✓ | x | x | x | x | x |
| Column 3 | C1 | C2 | C3 | C4 | C5 | C6 |
| State | ✓ | x | x | x | x | x |
| Column 4 | D1 | D2 | D3 | D4 | D5 | D6 |
| State | ✓ | ✓ | x | x | x | x |
| Column 5 | E1 | E2 | E3 | E4 | E5 | E6 |
| State | ✓ | x | x | x | x | ✓ |
| Column 6 | F1 | F2 | F3 | F4 | F5 | F6 |
| State | x | x | x | ✓ | x | x |
| Column 7 | G1 | G2 | G3 | G4 | G5 | G6 |
| State | ✓ | x | x | x | x | x |
| Column 8 | H1 | H2 | H3 | H4 | H5 | H6 |
| State | ✓ | x | ✓ | x | x | x | valve opened ✓
valve closed x

What is claimed is:

1. A simulated moving bed device, comprising an adsorption bed, a raw material feeding system, a desorbent feeding system, a circulating system, an extract system, a raffinate system, a program-controlled valve group, and an automatic control system, wherein the adsorption bed comprises a plurality of adsorption columns divided into an adsorption zone, a purification zone and a desorption zone;
   wherein each adsorption column of the plurality of adsorption columns has an upper end provided with a raw material feeding valve, a desorbent feeding valve and a circulation fluid feeding valve, and a lower end provided with a raffinate discharge valve and an extract discharge valve;
   wherein a check valve is provided between two adjacent adsorption columns;
   wherein the raw material feeding system is connected to the raw material feeding valve of the each adsorption column;
   wherein the desorbent feeding system is connected to the desorbent feeding valve of the each adsorption column;
   wherein the circulating system comprises a circulating pump connected to the circulation liquid feeding valve of the each adsorption column, a heater and a flow meter;
   wherein the extract system is connected to the extract discharge valve of the each adsorption column;
   wherein the raffinate system is connected to the raffinate discharge valve of the each adsorption column;
   wherein all the valves form the program-controlled valve group, the program-controlled valve group is connected to the automatic control system, and the automatic control system is configured to control an opening state and a closing state of each valve in the program-controlled valve group;
   wherein the circulating pump of the circulating system comprises a feeding port connected to an extract pipeline of the adsorption bed and a discharging port connected to the circulation liquid feeding valve of the each adsorption column;
   wherein the heater and the flow meter are provided downstream of the circulating pump of the circulating system;
   wherein the circulating pump of the circulating system is connected to each pipeline of the each adsorption column, and each pipeline of the each adsorption column connected to the circulating pump has a same volume; and
   wherein each connecting pipeline between the adsorption columns has a same volume.

2. The simulated moving bed device of claim 1, wherein the adsorption bed comprises 3 to 100 adsorption columns.

3. The simulated moving bed device of claim 1, wherein the adsorption bed comprises 8*N adsorption columns, and wherein N is an integer greater than or equal to 1.

4. The simulated moving bed device of claim 1, wherein the raw material feeding system comprises a raw material pump and a raw material heater located downstream of the raw material pump, and the raw material heater comprises an outlet pipeline connected to the adsorption column.

5. The simulated moving bed device of claim 1, wherein the desorbent feeding system comprises a desorbent pump and a desorbent heater located downstream of the desorbent pump, and the desorbent heater comprises an outlet pipeline connected to the adsorption column.

6. The simulated moving bed device of claim 1, wherein the extract system comprises an extract pump connected to an extract pipeline of the adsorption bed.

7. The simulated moving bed device of claim 6, wherein a cooler is provided on the extract pipeline.

8. The simulated moving bed device of claim 1, wherein the raffinate system comprises a raffinate pump or a back pressure valve, and the raffinate pump or the back pressure valve is connected to a raffinate pipeline of the adsorption bed.

9. The simulated moving bed device of claim 8, wherein a cooler is provided on the raffinate pipeline.

10. The simulated moving bed device of claim 1, wherein each of the valves in the program-controlled valve group is independently selected as one of a ball valve, a needle valve, a stop valve and a butterfly valve; and wherein each of the valves comprises a pneumatic actuator or an electric actuator.

11. The simulated moving bed device of claim 1, wherein the adsorption zone further comprises a buffer zone.

12. A simulated moving bed process implemented by the simulated moving bed device of claim 1, comprising:
   controlling valves to switch to change each feeding position and each discharging position, so as to perform a simulated movement of an adsorption zone, a purification zone and a desorption zone.

13. A simulated moving bed process implemented by the simulated moving bed device of claim 11, comprising:
   controlling valves to switch to change each feeding position and each discharging position, so as to perform a simulated movement of an adsorption zone, a purification zone, a desorption zone and a buffer zone.

14. The simulated moving bed device of claim 2, wherein the adsorption bed comprises 8*N adsorption columns, and wherein N is an integer greater than or equal to 1.

15. The simulated moving bed device of claim 2, wherein the raw material feeding system comprises a raw material pump and a raw material heater located downstream of the raw material pump, and the raw material heater comprises an outlet pipeline connected to the adsorption column.

* * * * *